(No Model.) 2 Sheets—Sheet 1.
C. C. SHUPE.
HILL MARKING ATTACHMENT FOR CORN PLANTERS.
No. 337,998. Patented Mar. 16, 1886.
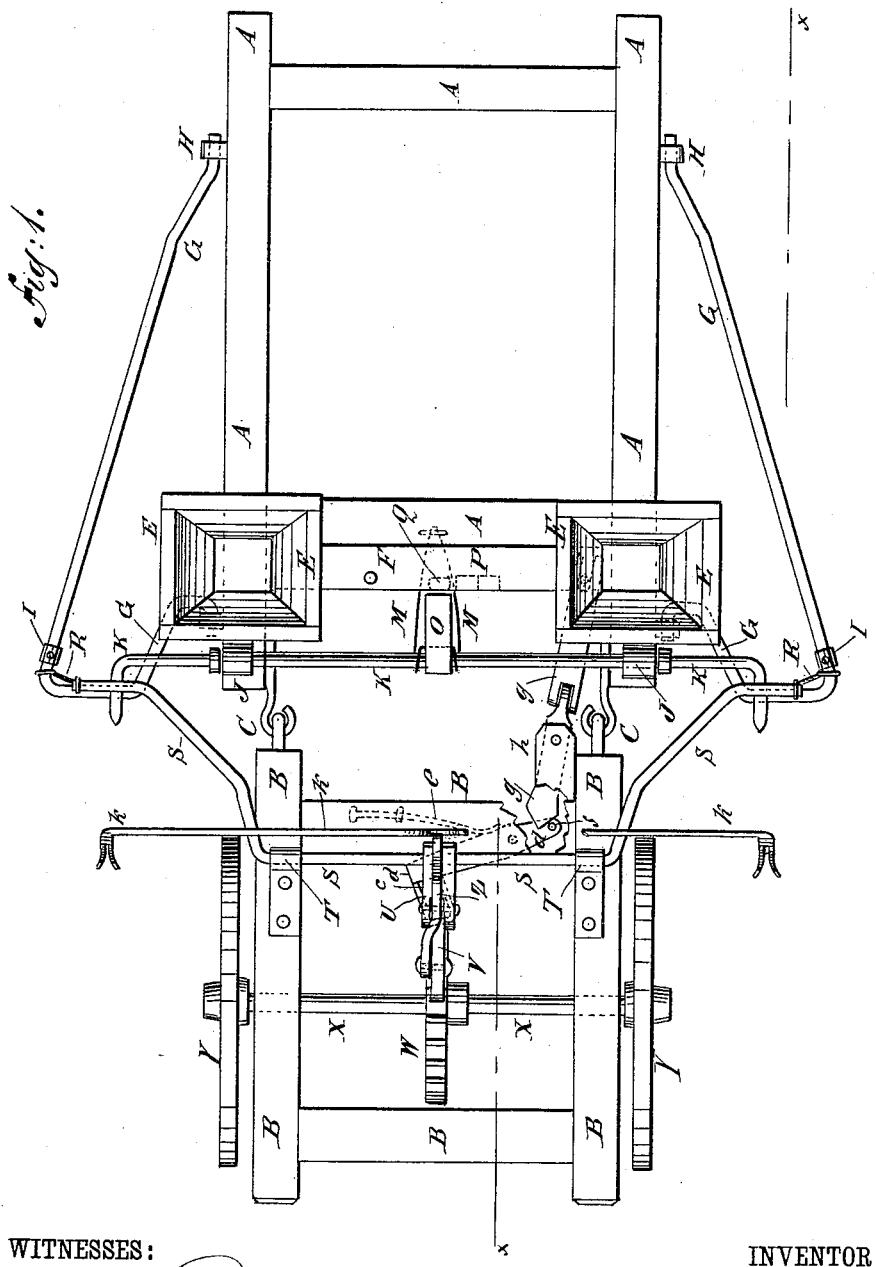
WITNESSES:
Chas. Nida
C. Sedgwick
INVENTOR:
C. C. Shupe
BY Munn & Co
ATTORNEYS.

(No Model.) 2 Sheets—Sheet 2.
C. C. SHUPE.
HILL MARKING ATTACHMENT FOR CORN PLANTERS.
No. 337,998. Patented Mar. 16, 1886.
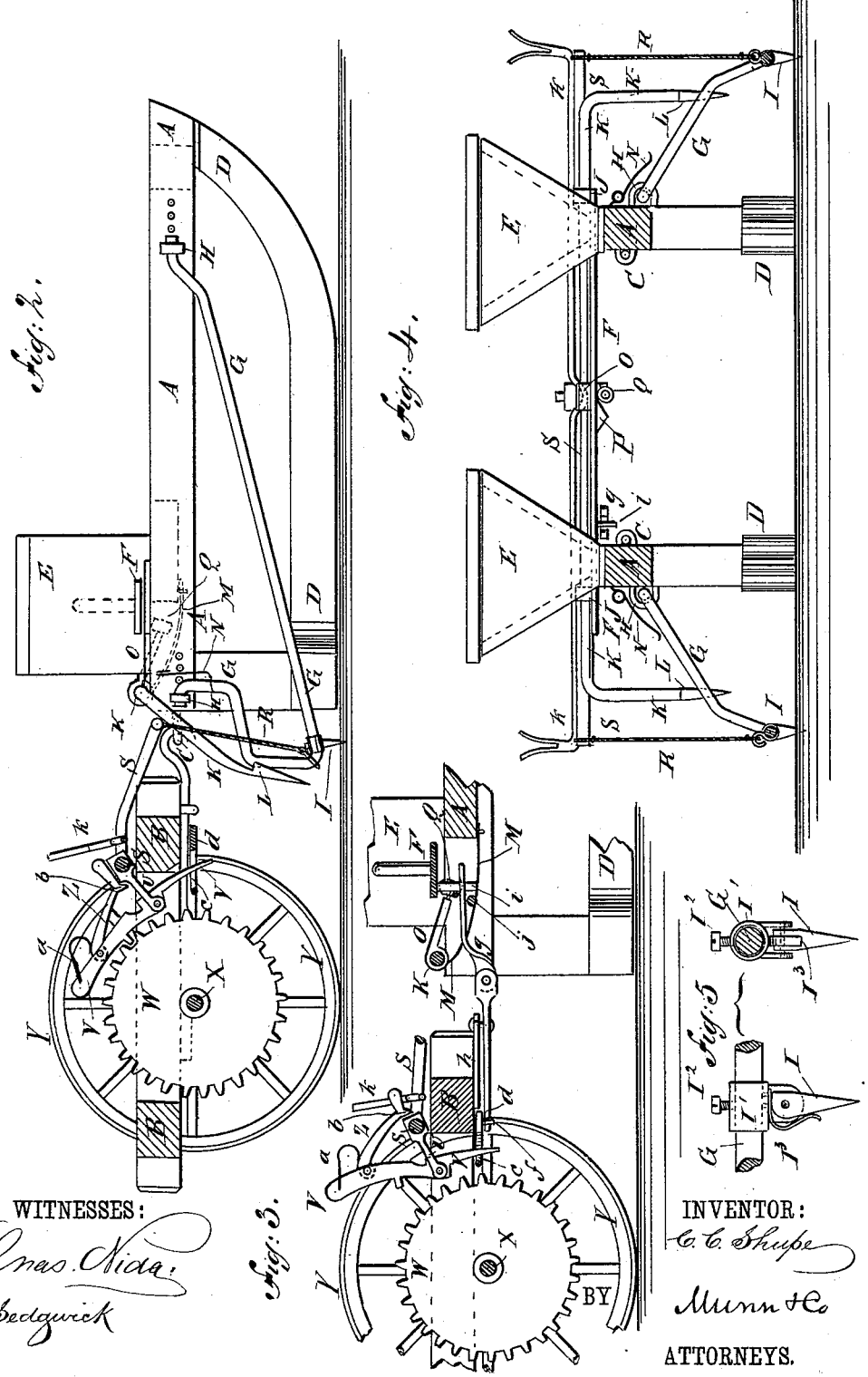
WITNESSES:
INVENTOR:
C. C. Shupe
BY Munn & Co
ATTORNEYS.

UNITED STATES PATENT OFFICE.

CHARLES C. SHUPE, OF MENDON, ILLINOIS.

HILL-MARKING ATTACHMENT FOR CORN-PLANTERS.

SPECIFICATION forming part of Letters Patent No. 337,998, dated March 16, 1886.

Application filed December 2, 1885. Serial No. 184,474. (No model.)

*To all whom it may concern:*

Be it known that I, CHARLES C. SHUPE, of Mendon, in the county of Adams and State of Illinois, have invented a new and useful Improvement in Hill-Marking Attachments for Corn-Planters, of which the following is a full, clear, and exact description.

Reference is to be had to the accompanying drawings, forming a part of this specification, in which similar letters of reference indicate corresponding parts in all the figures.

Figure 1 is a plan view of a part of a corn-planter to which my improvement has been applied, part being broken away. Fig. 2 is a side elevation of the same, partly in section, through the line $x\,x$, Fig. 1. Fig. 3 is a sectional side elevation of a part of the same, parts being broken away. Fig. 4 is a sectional front elevation of the same. Fig. 5 is a side and a rear elevation of the marker-points and their attachments, shown as attached to a part of the angular bar.

The object of this invention is to provide hill-marking attachments for corn-planters, constructed in such a manner as to be operated to mark the ground by the movement of the seed-dropping slide, and raised from the ground automatically as the planter is drawn forward.

The invention consists in the construction and combination of various parts of the marking attachment, as will be hereinafter fully described.

A represents the forward part of the planter-frame, and B the rear part, which parts are hinged to each other by hooks and eyes C, or other suitable couplings. The forward part, A, of the frame is provided with channel-opening runners D, seed-boxes E, and a seed-dropping slide, F, in the ordinary manner. The seed-dropping slide F can be operated by hand, by a lever, by a check-wire, or by any other of the well-known means for such purpose.

G are angular bars, the forward arms of which incline inward, and their rear arms incline inward, forward, and then inward. The ends of the angular bars G are journaled to the forward and rear parts of the side bars of the forward frame, A, by means of eyebolts H, or other suitable bearings.

I are points to mark the ground in line with the cross-rows. The points I are hinged to lugs formed upon or attached to sleeves I', placed upon the outer arms of the angular bars G, at or near their angles, and secured in place adjustably by set-screws $I^2$, so that the said points can be readily adjusted to cause them to mark the ground exactly in line with the cross-rows. The points I are held in working positions by springs $I^3$, attached to the sleeves I' and resting against the rear sides of the said points, and which are made of sufficient strength to hold the said points in position under ordinary circumstances, but which will yield, should the points strike an obstruction, to prevent the said points from being broken.

To the rear ends of the side bars of the frame A are attached bearings J, in which rocks a shaft, K. The rear parts of the shaft K are bent downward at right angles or nearly at right angles, and have their ends beveled upon their forward sides. Upon the forward sides of the arms of the shaft K, just above the bevels of their ends, are formed shoulders L, to serve as catches to engage with the rear arms of the angular marker-bars G, and support the said bars out of contact with the ground.

To the shaft K are attached the ends of one or more springs, M, which are coiled around the said shaft in such a direction that their elasticity will hold the arms of the said shaft K forward in such a position that they will engage with certainty with the rear arms of the marker-bars G. The other ends of the springs M are extended forward and secured to the under side of the rear cross-bar of the frame A. If desired, springs N can be attached to the side bars of the frame A, to rest upon the angular marker-bars G and insure their prompt descent when released from the catches L.

To the middle part of the shaft K is rigidly attached an arm, O, which projects forward beneath the seed-dropping slide F, so as to be struck by the double-inclined projection P, attached to or formed upon the lower side of the said seed-dropping slide F, and operated to rock the shaft K and withdraw the catches L from the marker-bars G each time the said bar F is moved to drop seed.

To the forward end of the arm O is pivoted a small roller, Q, to lessen the friction between the said arm and the seed-dropping slide F.

To the marker-bars G, at or near their angles, are attached the lower ends of short cords or chains R, the upper ends of which are attached to the ends of the outwardly and forwardly projecting arms of the shaft S, which rocks in bearings T, attached to the forward parts of the side bars of the rear frame, B.

To the middle part of the rock-shaft S is rigidly attached a rearwardly and downwardly projecting arm, U, to the forked end of which is pivoted a lever-pawl, V, having a tooth upon its lower side, at a little distance from its upper end, to engage with the teeth of the ratchet-wheel W, attached to the axle X of the drive-wheels Y. The axle X revolves in bearings attached to the side bars of the rear frame, B, and with it is rigidly connected one or both of the drive-wheels Y.

To the upper part of the lever-pawl V is pivoted the end of an arm, Z, which is held down by a spring, a, attached to the upper part of the said lever-pawl V, and resting upon the upper side of the arm Z, near its pivoted end. The free end of the arm Z is so formed as to rest against the flattened side of the rear end of the arm U, as shown in Fig. 2, and is provided with a tooth, b, to pass over and engage with the end of the said arm U, to hold the lever-pawl V out of contact with the ratchet-wheel W, as shown in Fig. 3. The lower end of the lever-pawl V is extended to pass through a loop or aperture, c, attached to or formed in the inner end of the lever d, pivoted at a little distance from its outer end to the lower side of the forward cross-bar of the frame B. The inner end of the lever d is pressed to the rearward by a spring, e, attached to the forward cross-bar of the frame B, and resting against the forward edge of the said lever d.

To the outer end of the lever d is attached a pin, f, with which engages the rear end of the lever g, which end is made angular, as shown in Fig. 1, so that the said lever d will be operated by each movement of the said lever g. The lever g is pivoted to an arm, h, attached to the forward cross-bar of the frame B. The lever g has a hinge joint formed in it a little in front of its pivot, and its forward end is forked to receive a pin, i, attached to the seed-dropping slide F. The hinged forward end of the lever g rests and slides upon a rod, j, attached to the rear part of the side bar of the frame A. With this construction, when the seed-dropping slide F is operated to drop the seed and release the markers G, the same movement operates the levers g d to move the lever-pawl V and disengage the bar Z from the end of the arm U, allowing the lever-pawl V to drop into gear with the ratchet-wheel W. As the ratchet-wheel W turns forward, it carries the lever-pawl V and the arm U with it, and turns the shaft S, so that its arms and the cords or chains R will raise the markers G until they are caught by the catches L. The forward movement of the lower end of the arm U causes the bar Z to slide up the said arm U until the tooth b has passed the angle at the end of the said arm U, and as the tooth of the lever-pawl V escapes from the teeth of the ratchet-wheel W the weight of the arms of the shaft S turns the said shaft, and raises the lever-pawl V into the position shown in Fig. 3, ready to be again dropped when the seed-dropping slide F is again moved to drop seed for another hill.

In case the seed-dropping slide be operated by a check-wire, the ratchet-wheel W, the lever-pawl V, and the mechanism connecting the said lever-pawl with the shaft S, and the seed-dropping slide F are omitted, and a bar, K, is attached to the arms of the shaft S, at a little distance from the axis of the said shaft. The ends of the bar K are bent upward nearly at right angles and with a slight inclination to the rearward, and are slotted to receive the said check-wire, the slots being made of such a width that the check-wire will slide through them easily, but which will not allow the knobs of the said wire to pass through, so that each knob of the check-wire will force the arm of the bar K to the rearward until the said knob slides off the end of the arm with which it is engaged. The rearward movement of the arms of the bar k raises the arms of the shaft S, and causes the cords or chains R to raise the markers G until they are caught by the catches L.

Having thus fully described my invention, I claim as new and desire to secure by Letters Patent—

1. The combination, with the forward frame, A, of a corn-planter, and the seed-dropping slide F, having double-inclined projection P, of the angular hinged markers G I, the rock-shaft K, having downwardly-projecting arms provided with catches L, the rigid arm O, attached to the said shaft, and the spring M, substantially as herein shown and described, whereby the said markers will be supported, and will be released by the movement of the said seed-dropping slide, as set forth.

2. The combination, with the angular markers G I, the rock-shaft K, having springs M, and downwardly-projecting arms provided with catches L, and the rear frame of a corn-planter, of the cords or chains R, the rock-shaft S, having projecting arms carrying the said cords or chains, and an operating mechanism, substantially as herein shown and described, whereby the said markers will be raised from the ground into contact with the said catches by the advance of the planter, as set forth.

3. The combination, with the wheels and axle Y X, the rear frame, B, and the rock-shaft S, having arms connected with the hinged markers G I by cords or chains R, of the ratchet-wheel W, attached to the said axle, the lever-pawl V, the rigid arm U, attached to the said shaft and carrying the said lever-pawl, and the spring-held bar Z, pivoted to the said lever-pawl and engaging with the said rigid arm, substantially as herein shown and described, whereby the advance of the planter is made to raise the marker from the ground, as set forth.

4. The combination, with the ratchet-wheel W, attached to the drive-wheel axle, the lever-pawl V, pivoted to the arm attached to the rock-shaft, having arms connected with the markers by cords or chains, and provided with the spring-held catch-bar Z, and the seed-dropping slide F, having pin $i$, of the lever $d$, having loop $c$ and pin $f$, and the jointed lever $g$, having angular rear end engaging with the pin of the lever $d$, and forked forward end engaging with the pin of the seed-dropping slide F, substantially as herein shown and described, whereby the said lever-pawl will be released by the movement of the seed-dropping slide and allowed to engage with the teeth of the ratchet-wheel, as set forth.

CHARLES C. SHUPE.

Witnesses.
 HELEN NUTT,
 MARY A. HIGBIE.